United States Patent
Bodin et al.

[19]

[11] Patent Number: 6,101,177
[45] Date of Patent: Aug. 8, 2000

[54] CELL EXTENSION IN A CELLULAR TELEPHONE SYSTEM

[75] Inventors: Roland Stig Bodin, Spanga; Georg Chambert, Uppsala, both of Sweden

[73] Assignee: Telefonaktiebolaget LM Ericsson, Stockholm, Sweden

[21] Appl. No.: 07/859,962

[22] Filed: Mar. 30, 1992

[51] Int. Cl.$^7$ .................................................. H04B 7/01
[52] U.S. Cl. ......................................... 370/336; 370/508
[58] Field of Search .................................. 370/95.1, 95.3, 370/95.2, 85.7, 108, 336, 337, 503, 507, 508, 516, 517; 455/33.1–33.2, 52.1; 375/40, 107, 108; 379/60, 61

[56] References Cited

U.S. PATENT DOCUMENTS

| | | | |
|---|---|---|---|
| 3,962,634 | 6/1976 | Russo | 370/108 |
| 4,607,257 | 8/1986 | Noguchi | 375/107 |
| 4,638,479 | 1/1987 | Alexis | 370/95.1 |
| 4,972,506 | 11/1990 | Uddenfeldt | 455/33.1 |
| 5,020,056 | 5/1991 | Chennakeshu | 455/52.1 |
| 5,077,759 | 12/1991 | Nakahara | 375/107 |
| 5,088,108 | 2/1992 | Uddenfeldt et al. | 455/52.1 |
| 5,212,689 | 5/1993 | Eriksson | 455/52.1 |
| 5,228,029 | 7/1993 | Kotzin | 370/95.1 |
| 5,229,996 | 7/1993 | Backstrom et al. | 375/107 |

FOREIGN PATENT DOCUMENTS

| | | |
|---|---|---|
| 43463/85 | 1/1986 | Australia . |
| 0 171 525 | 2/1986 | European Pat. Off. . |
| 0 210 698 | 2/1987 | European Pat. Off. . |
| 0 295 227 | 12/1988 | European Pat. Off. . |
| 0 451 694 | 10/1991 | European Pat. Off. . |

OTHER PUBLICATIONS

GSM Recommendation 05.01, version 3.3.1, dated Jan. 1990, entitled, "Physical Layer on the Radio Path: General Description".

GSM Recommendation 05.02, version 3.5.0, release date Jan. 1991, entitled, "Multiplexing and Multiple Access on the Radio Path".

GSM Recommendation 05.10, version 3.5.0, release date Jan. 1991, entitled, "Radio Sub–System Synchronization".

*Primary Examiner*—Chau Nguyen
*Attorney, Agent, or Firm*—Burns, Doane, Swecker & Mathis, L.L.P.

[57] ABSTRACT

In a cellular telephone system of the type having TDMA channels, the beginnings of the time slots of an uplink transmission as seen in the base station are offset from the beginnings of the time slots of a downlink transmission as seen in the base station by a predetermined amount. By offsetting the beginnings of the time slots, a mobile station is able to operate at an extended distance from the base station without any modifications to the mobile station. Because the mobile stations can operate at a greater distance from the base station without a decrease in the number of available channels, the cellular telephone system is particularly suitable for use in rural areas or coastal areas.

1 Claim, 4 Drawing Sheets

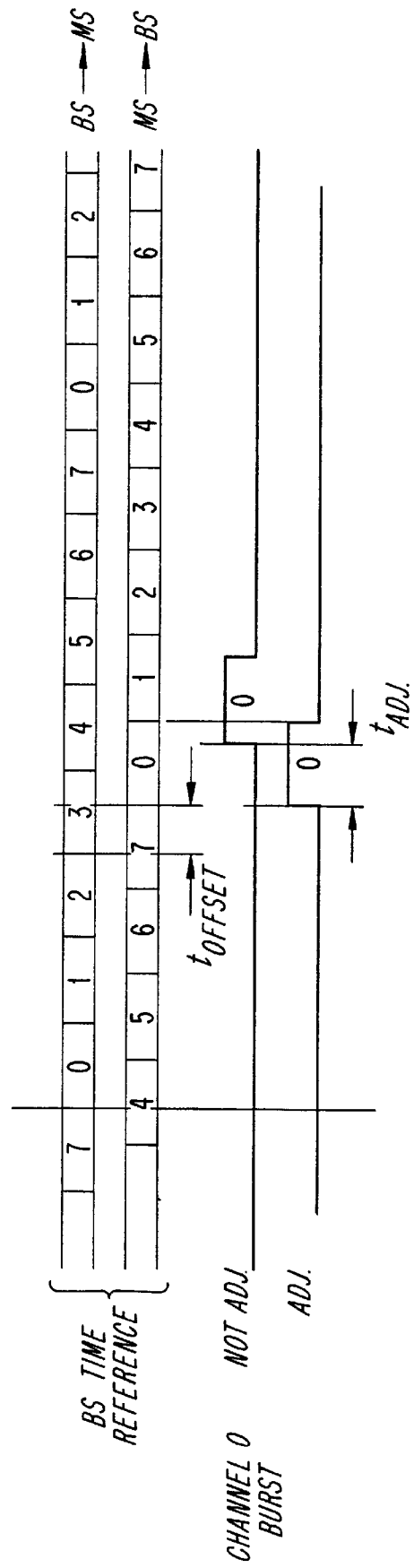

CELL EXTENSION IN A CELLULAR TELEPHONE SYSTEM

FIELD OF THE INVENTION

The present invention relates generally to cellular telephone systems having channels for transmitting information between base stations and mobile stations. More precisely, the invention relates to a cellular telephone system in which the mobile station can operate at an extended distance from the base station.

BACKGROUND OF THE INVENTION

The operator of a cellular telephone system often has to provide telephone service to profitable and more densely populated city areas as well as relatively less profitable and less densely populated rural areas or coastal areas. It is therefore desirable that a cellular telephone system cover as much area as possible with a minimum of equipment. One method of accomplishing this objective is to use relatively large cells.

The first cellular mobile radio systems placed in public use were analog systems that were typically used for speech or other types of analog information. These systems include multiple radio channels for transmitting analog information between base stations and mobile stations by transmitting analog modulated radio signals. One such system is the Nordic Mobile Telephone System NMT-450. Another known cellular radio system is the AMPS Mobile Radio System in the United States. The rapidly increasing usage of mobile radio systems has necessitated development of newer, more advanced digital systems that can accommodate a larger number of mobile stations using time division multiple access (TDMA) technology or code division multiple access (CDMA) technology.

In digital mobile telephone systems, e.g., GSM, ADC, and JDC, each radio carrier is divided into frames and each frame is subdivided into a number of time slots. Each time slot typically carries one connection (channel), and a burst of data is transmitted during each time slot. These types of systems are referred to as TDMA systems. Due to the finite propagation speed of radio signals, mobile stations at a distance from the base station must transmit a burst of data at a certain time in advance relative to the frame structure perceived in the mobile station in order that the burst of data or radio signal arrives at the base station in the correct time slot.

The base station typically measures the time of arrival for the access burst of data. An appropriate time interval for advanced transmission is calculated and transmitted to the mobile station. In the GSM system, the coding of this time interval, combined with the specified TDMA structure gives a maximum cell radius of approximately 35 kilometers.

In a TDMA system such as the GSM system, mobile stations can share a single carrier signal because the signal is divided into frames. Each frame is subdivided into time slots and mobile stations are assigned to one or more time slots depending upon the transmission mode. Each mobile station transmits bursts of data during its time slot which is advanced as necessary. Various published standards, such as those for the GSM digital mobile system in Europe and the EIA Interim Standard (IS-54) in the United States, set forth the specification for the transmission of a carrier signal that is modulated with the burst of digital data. For example, under the GSM standard, the carrier signal is divided into a frame consisting of eight equal time slots as illustrated in FIG. 1. The carrier signal is called a downlink (DL) when it is transmitted from the base station to the mobile station, and the carrier signal is called an uplink (UL) when it is transmitted from the mobile station to the base station.

In the normal transmission mode as illustrated in FIG. 1, each channel utilizes only one time slot during each uplink and downlink frame. Thus, a single frame can accommodate eight traffic channels under the GSM standard. When operating in the normal transmission mode, the mobile stations must operate at a relatively close distance to the base station, and the effective cell size is limited.

In the conventional extended transmission mode as illustrated in FIG. 2, the effective size of a cell in the GSM system can be enlarged, because the conventional extended range channels have longer time slots which can accommodate longer propagation delays. In the conventional extended transmission mode, the channel on which the data is transmitted utilizes two adjacent time slots in a frame. Thus, under the GSM standard, a single frame can accommodate four conventional extended channels, such as the four uplink channels 0, 2, 4, and 6 of FIG. 2.

It should be noted that the uplink transmission as seen in the base station in both FIGS. 1 and 2 differs from the downlink transmission as seen in the base station by three time slots which is typical for prior art TDMA systems according to the GSM standard. The difference has nothing to do with extended range. In other words, the beginning of the 0 time slot for downlink transmission (base station to mobile station) is advanced exactly three time slots from the 0 time slot of the uplink transmission as seen in the base station (mobile station to base station). The time slots of the base station are considered to be reference time slots.

It is possible to combine normal range channels of FIG. 1 with conventional extended range channels of FIG. 2 in the same cell and even on the same carrier signal. Calls are then set up on a channel of an appropriate channel type, depending upon the distance, and a call can be handed over to the other channel type if the distance changes. The only limitation is that the conventional extended channel must be able to accept handover access bursts within a slot consisting of two normal time slots.

While the conventional extended transmission mode of the GSM system can substantially increase the operating distance of a mobile station from a base station, there is a corresponding decrease in traffic load, because the number of channels is decreased from eight to four. Accordingly, there is a need for a cellular telephone system which can allow mobile stations to operate at a substantially increased distance from the base station without a corresponding decrease in the number of channels.

SUMMARY OF THE INVENTION

The present invention provides an improved cellular telephone system of the type having TDMA channels. The improved system allows a mobile station to operate at an extended distance from the base station, thereby effectively increasing the cell size of the base station without decreasing the number of available channels. In the present invention, the beginnings of the time slots of the uplink transmission are offset in time relative to the beginnings of the time slots of the downlink transmission by an additional fixed amount of time as seen in the base station. By offsetting the beginnings of the time slots of the uplink transmission relative to the downlink transmission and by including a timing adjustment into the transmissions, the mobile stations are able to operate at a defined distance interval from the base station without a capacity reduction as in the prior art.

The present invention is particularly well suited for use in rural and coastal areas. The present invention may also be particularly well suited for use in dense traffic areas in order to overcome severe obstructions such as lakes, highways, etc.

BRIEF DESCRIPTION OF THE DRAWINGS

FIGS. 4A, 4B, and 4C, are diagrams which compare the time slots of a normal transmission mode, a conventional extended transmission mode, and the transmission mode of the present invention.

DETAILED DESCRIPTION OF THE INVENTION

In the present invention, the communication channels are digital channels utilizing TDMA techniques. In other words, each carrier signal is divided into frames which are subdivided into time slots. During communication between a base station and a mobile station, the mobile station is assigned to a particular channel. The structure of the radio channels applicable to the present invention will be hereinafter described in greater detail. The channels may generally be categorized as either (1) access channels which transmit control information for setting up communication between the base station and a mobile station, or (2) traffic channels which actually transmit communications such as speech or data. Access channels are primarily used for monitoring and controlling mobile stations during the set up of the connection and during the registration of a mobile station, i.e., when the mobile station initially reports to the base station of the cell in which it is located.

Figure 1:
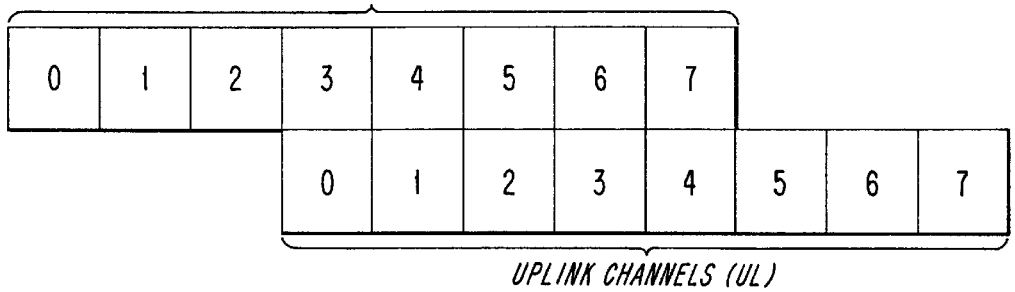
FIG. 1 is a diagram of the prior art downlink and uplink time slots of a GSM system operating in a normal mode.
Figure 2:
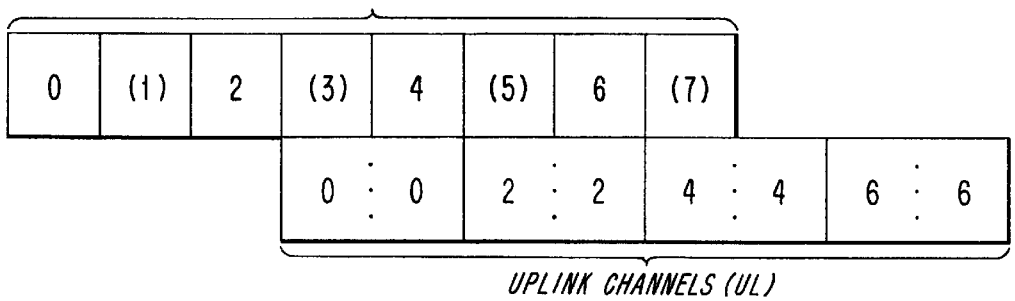
FIG. 2 is a diagram of the prior art downlink and uplink time slots of a GSM system operating in the conventional extended mode.

As explained above, the conventional method to extend the range of a cell in a cellular telephone system is to utilize channels occupying two consecutive time slots. Regulation of the advanced transmission time is done until the maximum advanced time has been reached. The burst is then allowed to slide into the second of the two time slots. This solution is illustrated in FIG. 2.

The novel extended cells of the present invention are achieved by changing the TDMA structure at the base station by adding an offset to the time reference for the uplink connections as seen in the base station which are serving the novel extended cell area. This delay of the time slot reference, allows transmission bursts originating from the remote mobiles to arrive in the right time slot. It is also notable that the present invention only requires modifications at the base station and not the mobile stations.

Figure 3:
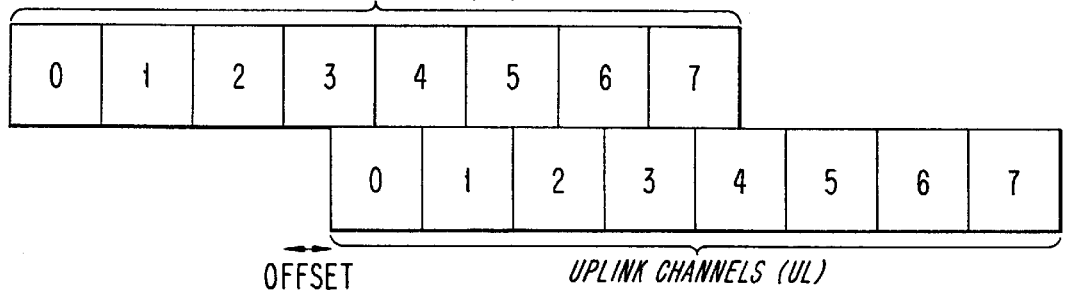
FIG. 3 is a diagram of the novel downlink and uplink time slots of the present invention.

The TDMA signal structure of the present invention is illustrated in FIG. 3. In FIG. 3, the time slots of the downlink (DL) transmission are designated 0–7 as is conventional in a GSM system. The time slots of the uplink (UL) are also designated as 0–7, and the time slots of the uplink transmission as seen in the base station are shifted three time slots and then offset by an additional predetermined amount from the time slots of the downlink transmission as indicated by the two-headed arrow labeled offset. In FIG. 3, the beginning of the 0 time slot of the uplink transmission is illustrated as being shifted three time slots and then offset approximately one half a time slot from the beginning of the 0 time slot of the downlink transmission. In a conventional GSM system the beginning of the 0 time slot of the uplink transmission as seen in the base station is shifted exactly three time slots from the beginning of the 0 time slot of the downlink transmission. Accordingly, the present invention, as illustrated in FIG. 3, offsets the time slot by approximately an additional half of a time slot. The present invention is not limited to offsetting the start of a time slot by half a time slot. In fact, if the start of the time slot is offset by a greater amount, the cell size is increased correspondingly.

The access channels for the present invention are substantially identical to access channels of the prior art. When a mobile station is accessing the system from a distance within a normal size cell, an access burst is transmitted on the access channel. This burst is shorter than a normal burst so that it will arrive within the intended time slot, even though there is no advanced transmission. The access burst position within the time slot is measured, and the control mechanism for the advanced transmission is started. When a mobile station is accessing the system from a distance greater than the normal maximum cell radius, 35 kilometers for the GSM system, the access burst will slide into the time slot following the intended one. Accordingly, the present invention preferably includes at least one conventional extended range channel (two time slot channel) as an access channel for mobile stations at an extended distance from the base station. In the conventional extended range channel, the access channel handling is modified so that access bursts arriving within any two consecutive time slots can be detected and the delay can be measured.

The measured access delay is then used to determine if the call shall be set up on a normal channel or on a channel with extended range capability. The access channels used in the improved radio communication system of the present invention, therefore, are the same whether the conventional extended transmission mode or the novel extended transmission mode is utilized.

Figure 4A:
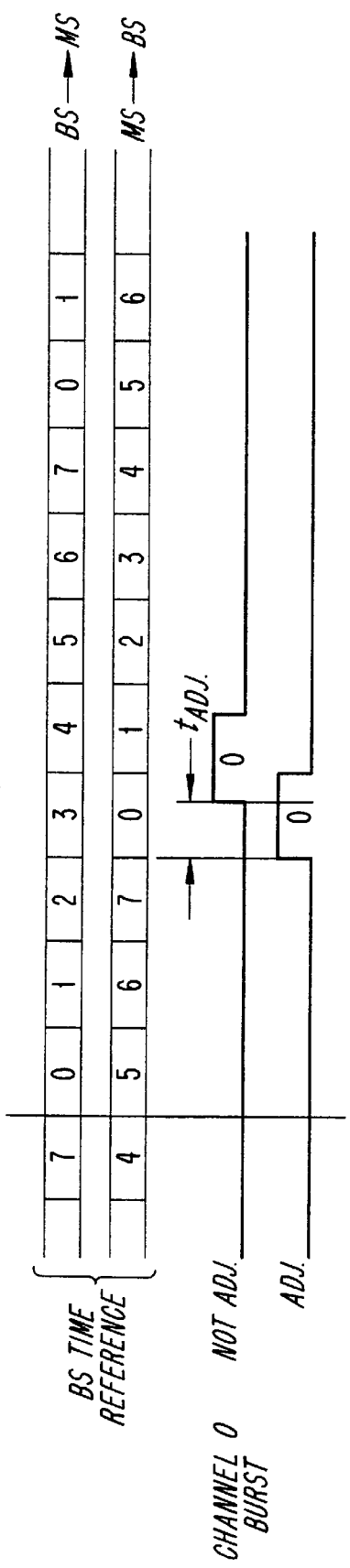
Figure 4B:
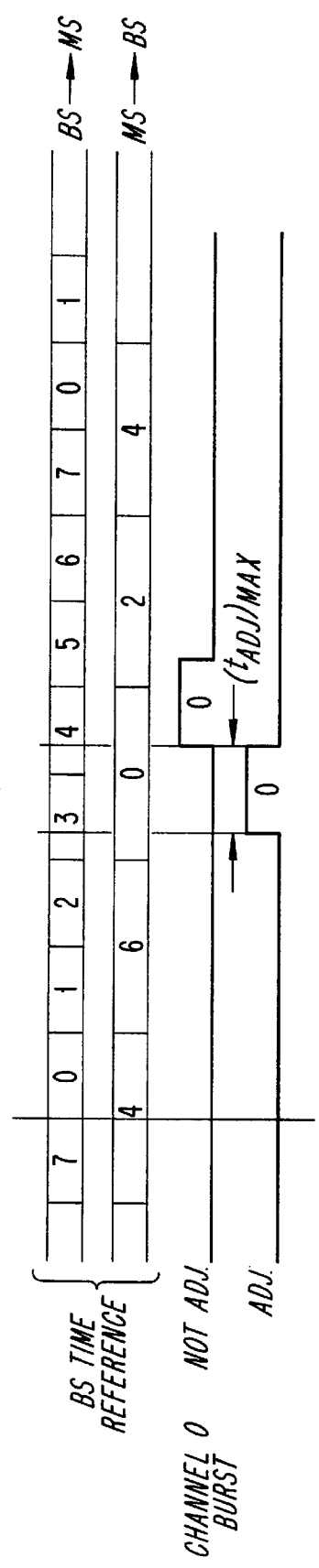

Referring now to FIGS. 4A, 4B, and 4C, a comparison between the normal transmission mode, the conventional extended transmission mode and the novel extended mode of the present invention can be made. FIGS. 4A, 4B and 4C illustrate the downlink and uplink transmissions between the base station and the mobile stations as seen in the base station. The downlink transmission from the base station to the mobile station is designated as BS-MS, and the uplink transmission from the mobile station to the base station is designated MS-BS.

In FIG. 4A it can be appreciated that in the normal transmission mode both the downlink and uplink transmissions are divided into eight time slots 0–7 and that the beginning of the 0 time slot of the uplink transmission is shifted exactly three time slots from the beginning of the 0 time slot of the downlink transmission. It can also be appreciated that a burst in the 0 channel time slot is adjusted by an amount t(ADJ). The amount t(ADJ) means that there is a comparison made between the time of arrival of the burst when the mobile station has not adjusted its timing and after the mobile station has been ordered by the base station to adjust. The amount t(ADJ) is ordered, thereby adjusting the time interval so that the burst arrives within the correct time slot.

Referring now to FIG. 4B, there is a diagram of the downlink transmission and uplink transmission for a cellular telephone system operating in the conventional extended mode. In the conventional extended mode, the downlink transmission BS-MS is divided into eight time slots, and the uplink transmission MS-BS is divided into four time slots. It can be appreciated that the beginning of the 0 time slot for the uplink transmission is shifted exactly three conventional time slots from the beginning of the corresponding 0 time slot of the downlink transmission. It can be further appreciated that the burst in the 0 time slot is adjusted by an amount t(ADJ).

Referring now to FIG. 4C, the downlink and uplink transmissions for the novel extended transmission mode of the present invention are illustrated. It can be appreciated that the downlink transmission and the uplink transmission are both divided into time slots 0–7. When the mobile station is outside the normal range of the cell (but within the allowed extended range) the burst from the mobile station is received according to the NOT ADJ diagram. If no offset is added by the base station, the burst would slide into the second time slot 1. The TDMA structure at the base station, however, is offset (approximately one half of a slot) in order to handle the mobile station in the extended range. Furthermore, to get the burst received inside the slot timing of the base station, the mobile station in the extended range is ordered to adjust (advance its transmitting time) by the amount t(ADJ). Due to the timing advance and base station offset, the burst is then received within the correct 0 time slot as is shown in the lower portion of FIG. 4C.

Figure 5B:
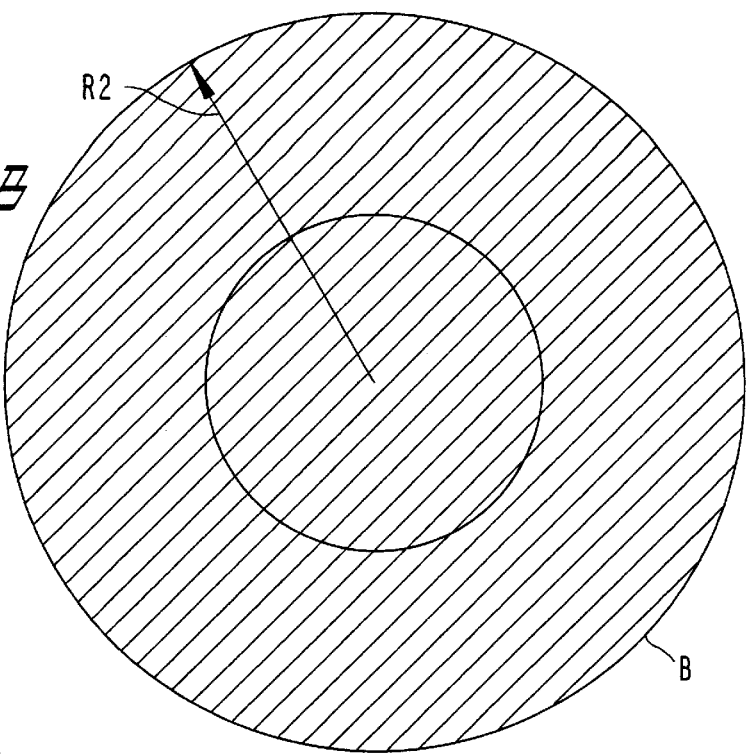
FIGS. 5A, 5B and 5C are diagrams of the coverage areas provided by channels operating in the normal transmission mode, the conventional extended transmission mode, and the novel extended transmission mode of the present invention.
Figure 5A:
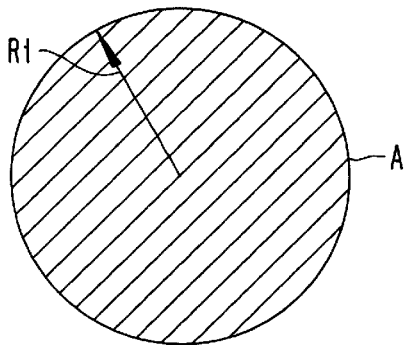
Figure 5C:
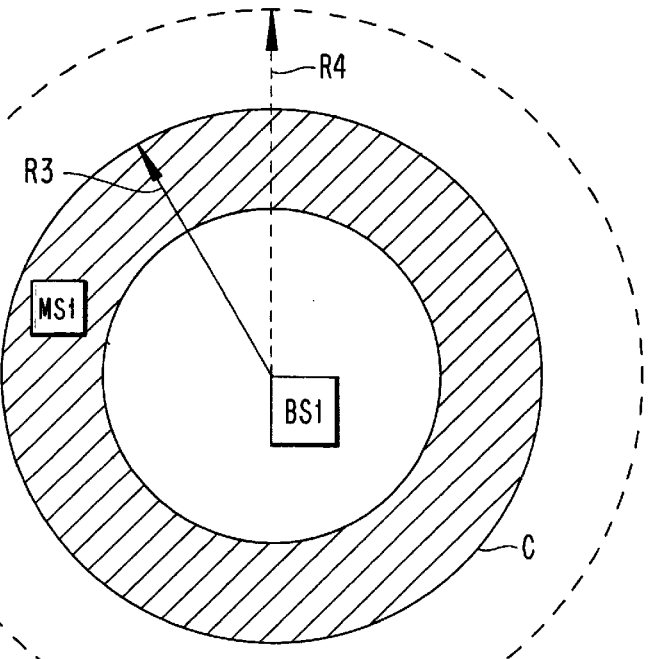

Referring now to FIGS. 5A, 5B, and 5C, the diagrams illustrated in these figures respectively depict the coverage areas or cell sizes when operating in the normal transmission mode, the conventional extended transmission mode, and the novel extended transmission mode of the present invention. As illustrated in FIG. 5A, in the normal transmission mode of a GSM system the coverage area or cell size is a circular area A which has a radius of R1 which is typically 35 kilometers. In the GSM system the base station adjusts the mobile station advance transmitting time so bursts received from the mobile stations at distances up to 35 km distance will arrive within the correct time slot.

As illustrated in FIG. 5B, in the conventional extended transmission mode of a GSM system, the coverage area may be extended to include a circular shaped area B having a maximum radius R2 which is typically 70 kilometers. In the conventional extended transmission mode, the burst is allowed to arrive up to one time slot interval too late, and the radius R2 can, therefore, be extended up to a distance of approximately 70 kilometers.

As illustrated in FIG. 5C in the novel extended transmission mode of the present invention, the coverage area includes a ring shaped area C having a radius R3, if the additional offset is approximately one half a time slot. A cell having the increased coverage area of the present invention has a base station BS1 and at least a first mobile station MS1 residing in the increased coverage area. The ring shaped area C has an outer periphery somewhat less than the outer periphery of the conventional extended mode illustrated in FIG. 5B. In the novel extended transmission mode, if the offset is increased by an additional time $t_1$ which is greater than the time t associated with radius R3, the effective radius of the cell can be increased to the radius R4, and the coverage area would include a larger ring shaped area. The ability to increase substantially the radius of the coverage area is particularly significant in coastal areas where it is difficult to locate fixed base stations for marine use.

While the invention has been described in its preferred embodiments, it is to be understood that the words that have been used are words of description rather than of limitation, and that changes within the purview of the present claims may be made without departing from the true scope of the invention in its broader aspects.

We claim:

1. A method in a cellular radio communication system having an extended cell range and including at least a fixed base station and a number of mobile stations, at least one of said mobile stations being in said extended cell range, said base station and said mobile stations transmitting and receiving in corresponding time slots in a transmitting frame and a receiving frame, respectively where a transmitting frame is displaced a first standardized time offset relative to a receiving frame, each including a certain number of time slots in accordance with a conventional normal transmission mode, comprising the steps of:

transmitting an access burst from said mobile stations within a time slot which is extended in accordance with a conventional extended transmission mode in order to measure a delay between a remote mobile station at an extended distance from the base station;

determining from said measured delay whether a call should be set up in accordance with said conventional normal transmission mode, said conventional extended transmission mode or in accordance with an extended transmission mode; and adding, in said base station to said first standardized time offset, a second time offset related to said measured delay, if it is determined that said call should be set up in said extended transmission mode, wherein the base station receives bursts from said mobile stations and the mobile stations receive bursts from the base station while maintaining the same number of time slots as in said conventional normal transmission mode.

* * * * *